United States Patent [19]

Sage et al.

[11] 4,117,964
[45] Oct. 3, 1978

[54] CAR TOP CARRIER ASSEMBLY

[75] Inventors: Howard M. Sage, Phoenix; John C. Abromavage, Tempe, both of Ariz.

[73] Assignee: U-Haul International, Inc., Phoenix, Ariz.

[21] Appl. No.: 811,932

[22] Filed: Jun. 30, 1977

Related U.S. Application Data

[63] Continuation-in-part of Ser. No. 794,900, May 9, 1977.

[51] Int. Cl.² ............................................. B60R 9/04
[52] U.S. Cl. .................................. 224/42.1 E; 220/84
[58] Field of Search ...................... 224/42.1 E, 42.1 F, 224/42.1 R, 42.1 D, 29 R, 42.45 R; 220/84, 5 R, 5 A

[56] References Cited

U.S. PATENT DOCUMENTS

| 895,209 | 8/1908 | Smith | 220/84 |
|---|---|---|---|
| 2,263,510 | 11/1941 | Lindsay | 220/84 UX |
| 2,788,929 | 4/1957 | Gallagher | 224/42.1 F |
| 2,812,992 | 11/1957 | Lysen | 224/42.1 E X |
| 3,915,362 | 10/1975 | Hart | 224/42.1 E |

*Primary Examiner*—Trygve M. Blix
*Assistant Examiner*—Jerold M. Forsberg

*Attorney, Agent, or Firm*—David H. Semmes; Warren E. Olsen

[57] ABSTRACT

A car top carrier assembly which is characterized by a light weight carrier container with an overall rectangular solid configuration, having its edges and corners radiused between all intersections of planar surfaces. The container has no internal frame, but rather the frame itself is comprised of a horizontal deck member, vertical corner support members, and horizontal edge supports, with the planar top and side portions being simple rectangular pieces of sheet material which are flangedly connected onto the corner and edge supports to define the overall container. The car top carrier is mounted upon a car top through a pair of contracting support tubes, which exert a contractive force proximate the edges of a car top, while inherently locating the superposed container in a fixed position as a consequence of the engaging step. The present invention thereby defines a particularly strong and light weight car top carrier, one which is significantly characterized by a container which requires no separate internal framing members, since the load-bearing frame is comprised of aluminum extrusions which themselves define the radiused corners and edges of the container.

11 Claims, 11 Drawing Figures

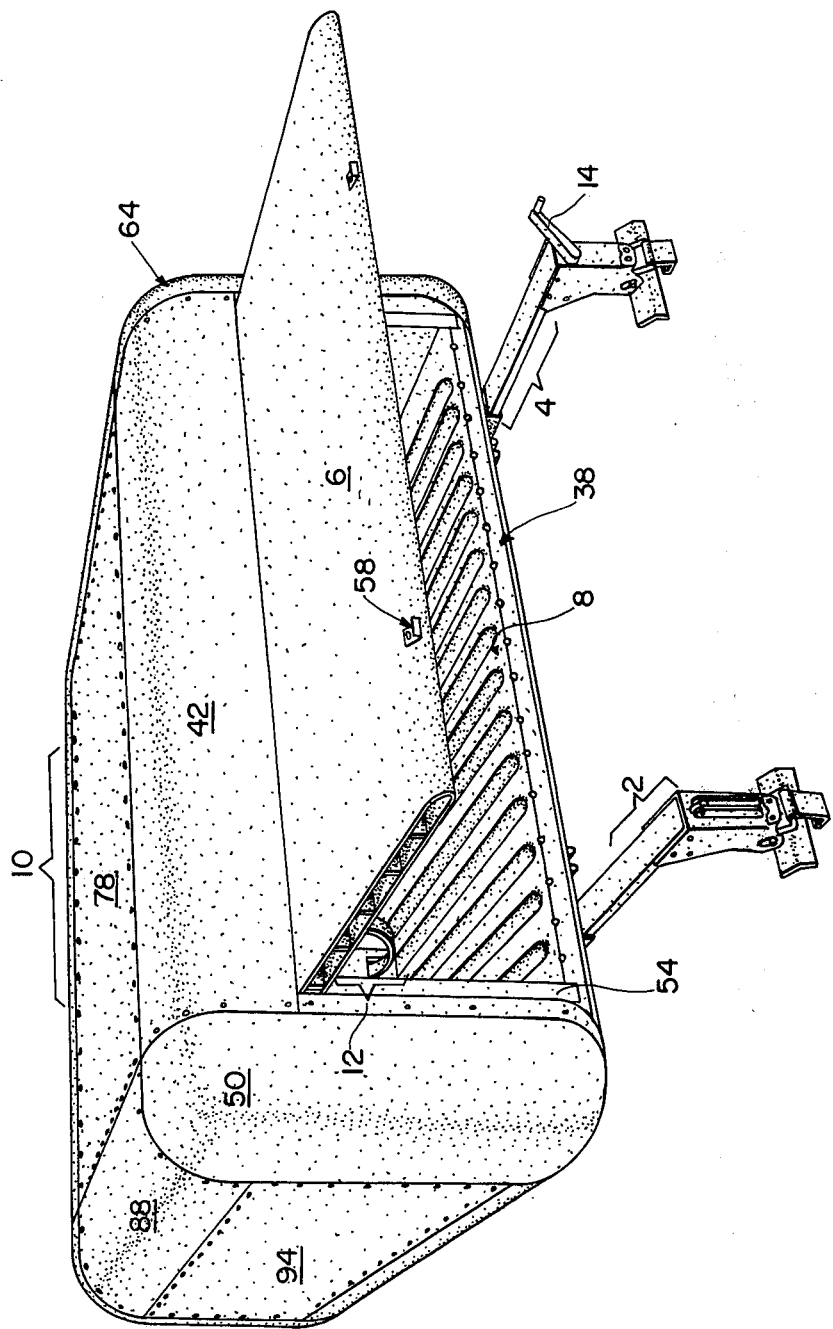

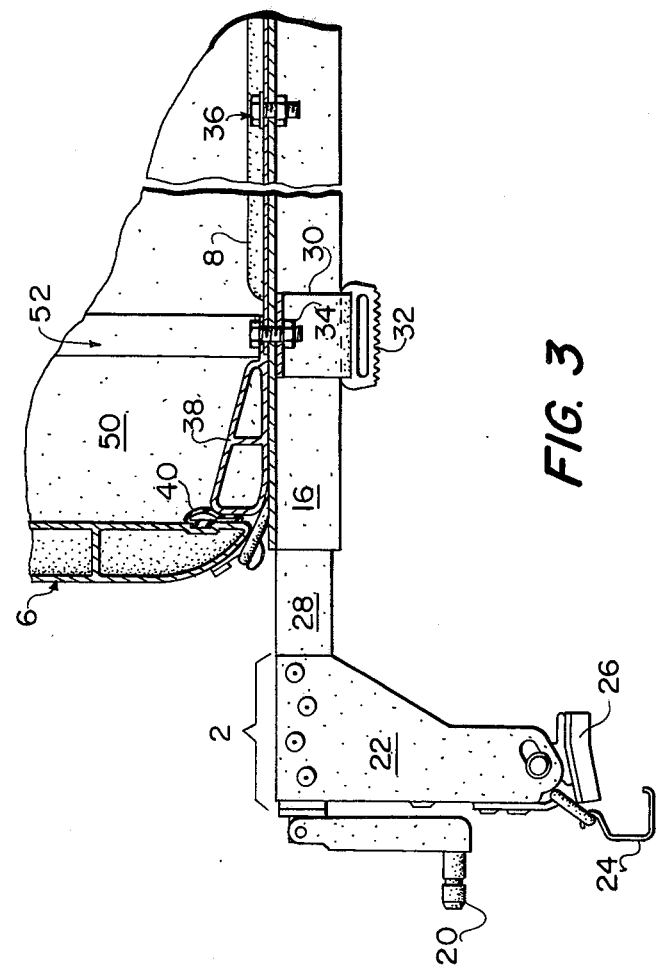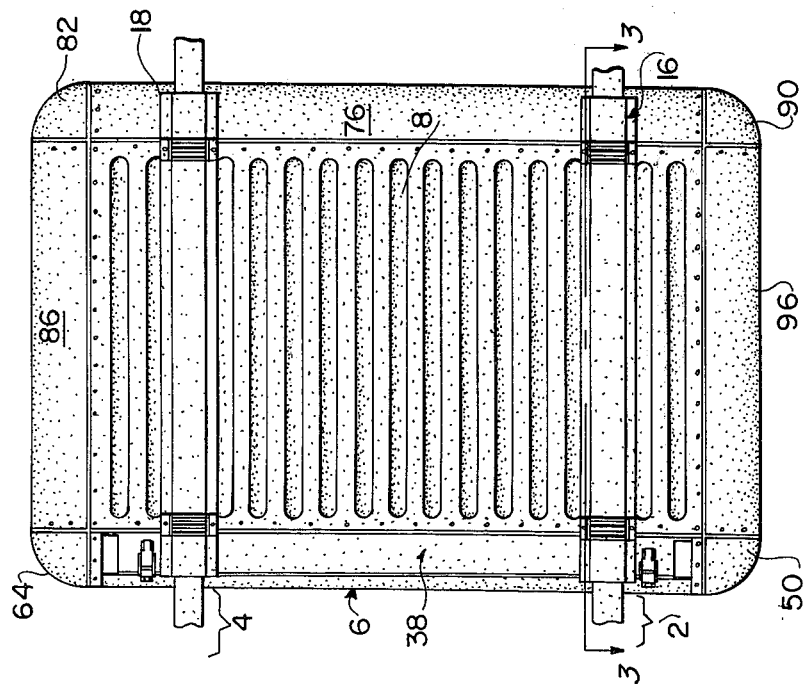

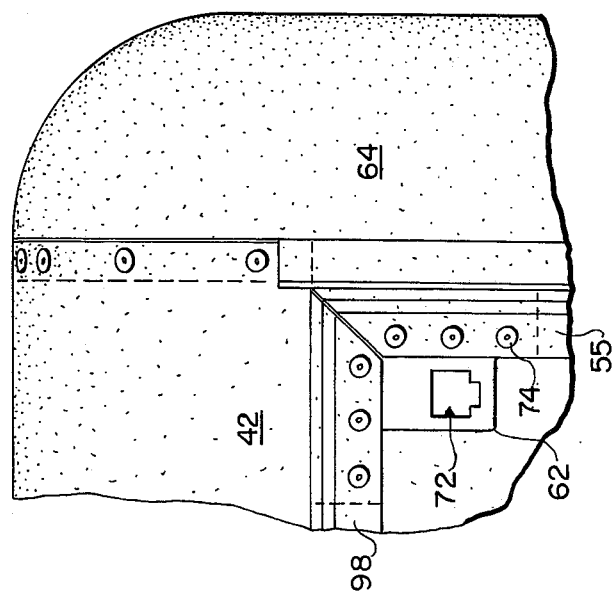
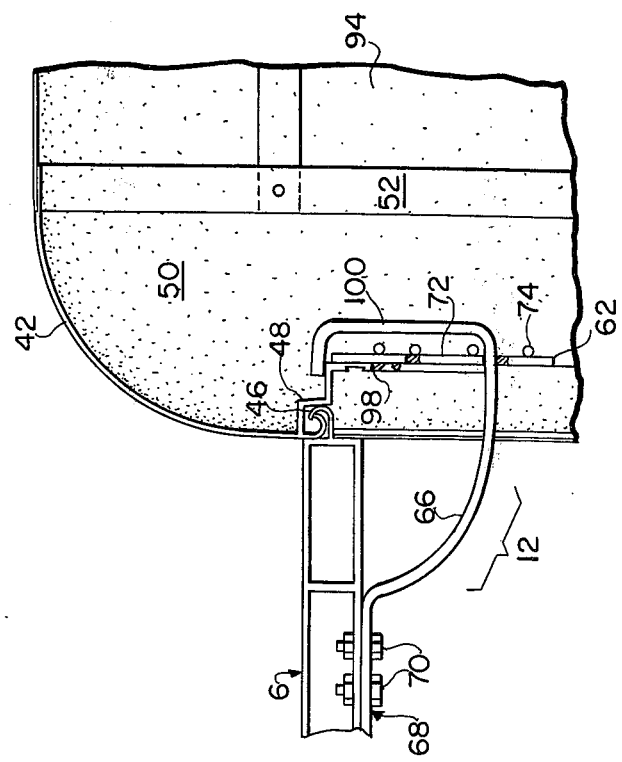

CAR TOP CARRIER ASSEMBLY

CROSS REFERENCE TO RELATED APPLICATIONS

The present invention is a continuation in part of our earlier application entitled Adjustable Car Top Carrier Support, which was filed on May 9, 1977, and has been assigned Ser. No. 794,900, said prior application being incorporated herein by reference.

BACKGROUND OF THE INVENTION

1. Field of the Invention

The present invention relates to a car top carrier assembly, and particularly one that is characterized by a uniquely constructed container that is superposed upon at lease one horizontally disposed means for mounting the assembly upon a car top. The embodiment of the invention illustrated herein includes a container construction which requires no internal load-bearing frame, since the frame itself is defined by a number of extrusions which function as frame, corner and edge defining members. All corners and edges of the carrier container are radiused so that there are no sharp intersections between the planar surfaces which otherwise define the rectangular solid configuration of the container. In the preferred embodiment the carrier mounting is a support which exerts contractive mounting forces only on the edges of the car top, when a crank handle is turned to contract support tubes which otherwise are freely slideable within a track mounted below the bottom surface of the container. The container is further characterized by a side access door in one or more vertical sides of the container, with the access door being hinged to a perimetrical flange portion on the lower horizontal edge support on that side. The thusly hinged door allows very efficient loading of the carrier, by standing at one side of the vehicle upon which the carrier is mounted.

2. Description of the Prior Art

Prior art car top carrier constructions are illustrated by the prior art specifically noted in the co-pending parent application entitled Adjustable Car Top Carrier Support, which is incorporated herein by reference. There is not known in the prior art a car top carrier assembly which is characterized, firstly, by an overall rectangular solid configuration having all edges and corners radiused between all intersections of the planar surfaces which define the overall rectangular shape. Secondly, the present invention provides for a particularly strong and light weight structural arrangement by employing four vertical extruded corners and upper horizontal edge supports upon a horizontal deck member as the load-bearing structure of the container. The structural frame defined by these load-bearing members allows the carrier access door to be mounted directly upon portions of perimetrical flanges of these extruded members, and also allows aluminium sheet material to be flangedly mounted to define the other planar surfaces of the container. Thirdly, the use of extruded vertical corner and horizontal edge members with perimetrical flanges allows simplicity of construction, since various portions of the perimetrical flanges interconnect the vertical corner members and horizontal edge members, as well as providing a simple fashion of mounting the access door frame and the planar top and side members. The prior art known to applicants does not allow for the structural integrity which is obtained by the present invention, and particularly a structural integrity which allows for a upwardly hinged access door to be mounted directly upon the load-bearing members of the container. Finally, the present invention is significantly characterized by the interconnection of the superposed container with the car top carrier support mechanism, whereby pairs of horizontal and contractable support tubes are freely slideable within carrier tracks mounted on the bottom surfaces of the container, so that contraction of the support tubes will also cam the superposed container in a position as the device is mounted upon a car top.

BRIEF SUMMARY OF THE INVENTION

The present invention is an adjustable car top carrier assembly, one which is operable for use in either a gutterless or a conventionally guttered car top, and significantly characterized by a superposed container that is light weight and sufficiently strong to support a side access door without the need for additional load-bearing frame structure.

According to the preferred embodiment of the invention, the car top carrier assembly container is characterized by an overall rectangular solid configuration, having all edges and corners radiused between the intersections of the planar surfaces defined in the overall configuration. The radiusing of the outside edges and corners is achieved by employing extrusions, preferably of aluminium, which have compound curvatures and perimetrical flanges, i.e., flanges which extend completely around the perimeters of each of the extrusion members. Four vertical corner support extrusions are employed, as well as a horizontal deck member and four upper horizontal edge support extrusions. The vertical corner extrusions, as well as the upper horizontal edge extrusions, include mating portions on their perimetrical flanges so that the load-bearing structure of the container is achieved by the interconnection of the edge and corner support members, alone. The interconnections are easily accomplished by riveting the mating portions of the respective flanges on each of the corner and horizontal edge support members. In this fashion a rectangular frame is defined by the walls of the container itself, without the need for additional bracing or structural reinforcement. Because each of the corner and edge members includes a perimetrical flange, the interconnected frame structure defines rectangular side and top portions, with exposed portions of the flanges allowing the mounting of simple sheet materials onto the flanges. The preferred material for the mounting of the planar sides of the container is also aluminum, and simple aluminum sheet material can be riveted onto the exposed portions of the perimetrical flanges which are presented when the container frame is defined, as discussed above.

The generous radiusing of all corners and edges of the otherwise rectangular solid shape of the container also promotes the maintaining of laminar air flow over the container when it is being employed upon a vehicle car top in highway operation. From an important structural point of view, the provision of large radius frame members also allows exceptional rigidity to the structure, without undue weight penalties. This exceptional rigidity is taken advantage of to mount an upwardly hinged access door on one side of the container, and a door frame is illustrated herein to be mounted directly upon the exposed perimetrical flange portions which serve to define that vertical side of the container upon which the access door is mounted. The exceptional rigidity allows the access door to be upwardly hinged, without danger that the structural integrity of the container will be compromised.

The horizontal deck member, which defines the bottom surface of the container is preferably a corrugated aluminum one piece member, with its own perimetrical flange arrangement for riveting the deck to interconnection with the remaining parts of the container. The interconnection of the horizontal deck to the superposed container structure is accomplished by intermediate connection with lower horizontal edge supports, which are also radiused and comprised of aluminum extrusions. Three of the lower horizontal edge supports may simply be provided with flanges for the mounting of vertical aluminum sheets to define three sides of the container, and the fourth lower horizontal edge support is illustrated in the preferred embodiment to become part of the lower door frame, while also having flanges which interconnect with portions of the perimetrical flanges on the vertical corner members which are disposed on either side of the access door.

Accordingly, it is a primary object of the present invention to achieve a particularly strong and light weight container construction, and one which is adaptable for use with a contracting type of car top mounting support.

A related object of the present invention is a car top carrier assembly which is structurally defined by light weight extrusions at all exterior corner dimensions, so that simple sheet material may be used to enclose the planar surfaces which define the top and at least three sides of the container.

It is a still related object of the present invention to teach a car top carrier construction which allows an upwardly hinged access door as one vertical side of the container, without compromise of the structural integrity of the container as a whole.

BRIEF DESCRIPTION OF THE DRAWINGS

FIG. 1 is a perspective view of a preferred embodiment of the present invention, illustrating the overall construction which is taught herein;

FIG. 2 is a bottom view of a car top carrier assembly, according to the preferred embodiment;

FIG. 3 is a partial section view illustrating details of the car top support means and the door frame and horizontal deck construction taught according to the present invention;

FIG. 7 is a partial section view of the access door hinged construction according to the present invention;

FIG. 8 is an external view showing contructional features according to the present invention;

DESCRIPTION OF THE PREFERRED EMBODIMENT

Figure 4:
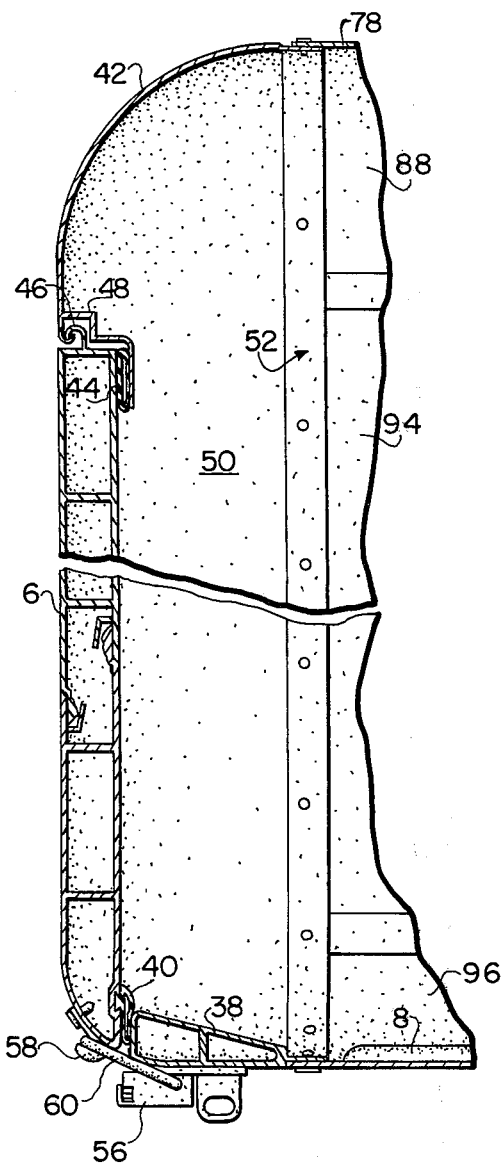
FIG. 4 is a vertical section view showing details of the present invention.

The preferred embodiment of a car top carrier assembly according to the teachings of the present invention is illustrated in perspective view at FIG. 1. With reference to FIG. 1, the car top carrier consists of a container, 10, superposed upon the top surface of the horizontally disposed carrier mounting means. In FIG. 1 two carrier mounting means are illustrated at 2 and 4. Pairs of carrier support tubes are slideable within the carrier tracks mounted on the underside of the container, in a fashion which is further discussed in our copending parent application entitled Adjustable Car Top Carrier Support, Ser. No. 794,900, which was filed on May 9, 1977, and is incorporated herein by reference.

The carrier portion which is particularly taught by the present invention is characterized by an overall rectangular solid configuration which has all its edges and corners radiused between the intersections of those planar surfaces which define the overall configuration. The present invention particularly teaches a structural arrangement wherein the frame of the container is comprised of certain of the wall elements, and the necessity for a separate internal, or external, frame structure is completely obviated. The container frame is actually comprised of the interconnection of horizontal deck member, 8, which also defines the bottom surface of the container, vertical corner supports, such as 50 in FIG. 1, which define each of these four vertical corners of the container, and horizontal upper edge supports, such as 42 in FIG. 1, which define the four horizontal upper edges of the container. The container, 10, is totally dependent for its load-bearing and structural integrity on these elements, so that the planar surfaces which define each of the five sides of the overall rectangular solid may be extremely light weight, and non-load-bearing. As shown in FIG. 1, there is a forward front corner support, 50, which is flangedly interconnected with the forward upper horizontal edge support, 88, and the left side upper horizontal edge support member, 42. The top of the container, 10, is a rectangular sheet of material, 78, which is secured simply by riveting or otherwise fastened, to exposed perimetrical flanges on the upper horizontal edge members 88, 42, for example. The container, 10, also includes a side access door, 6, and said access door is hinged to a first perimetrical flange portion on the lower horizontal edge of the associated horizontal edge support member, 42. The access door, 6, is supported in the position shown in FIG. 1 by a door hinge assembly, 12, and the door itself is substantially planar with a curved portion proximate the horizontal edge of the door that is opposite its hinged edge. This curved portion supports a latching member, 58, which is operable for engagement with a latch mechanism which is hereinafter described, and which is located on a lower horizontal door frame support, 38.

A bottom view of the invention is shown in FIG. 2, and it illustrates that the forward support tube assembly, 2, is slideably mounted within a forward carrier track, 16, in a manner identical with the rear support assembly, 4, which is slideably mounted within a rear carrier track, 18. The relative directions "front" and "rear", as well as other such terms are used for convenient reference to the attitude of the device as shown in FIG. 1, and, of course, are not limiting. Each of the carrier tracks in the preferred embodiment have a top surface which is rigidly affixed to the bottom surface of the rectangular and horizontal deck member, 8. The horizontal deck member, 8, is preferablly a corrugated stamped aluminum member, and it also includes a perimetrical flange for rigid interconnection and definition of the load-bearing frame of the device. With reference to FIG. 2, the four sides comprising the perimeter of the deck, 8, are flangedly interconnected with the respective four vertical corner supports through lower horizontal edge support members. A rear lower horizontal edge support is identified at 86, and a back side lower horizontal edge support is identified at 76. An access door side lower horizontal edge support member is shown at 38. It can be appreciated that the respective four vertical corner supports of the container are structurally equivalent, i.e., the forward front vertical corner support, 50, has a perimetrical flange as do the remaining vertical corner supports 64, 82 and 90. The preferred material for the vertical corner supports is aluminum which has been extruded into the compound curvatures required to define all edges and corners of the overall configuration so that there is a smooth radius between all intersections of what would otherwise be planar surfaces of the rectangular solid shape.

FIG. 3 is a partial sectional view taken along the line 3—3 of FIG. 2, and illustrates how the deck, 8, is flangedly interconnected with the lower door frame and front lower horizontal edge support member, 38. The member 38 includes a flange for a rigid interconnection with an associated flange on the front side of the deck, 8, and may be rivited or bolted as shown by the fastener, 34. The interconnection between the lower front horizontal edge, 38, and the deck, 8, may also be used to secure both the forward carrier track, 16, and a support bracket, 30. At the bottom of support bracket 30 may be provided a rubber bumper element, 32, to allow numbers of the device to be conveniently stacked in a vertical fashion, without scratching. Fasteners, such as bolts 36, are used to interconnect the bottom surface of the container in a rigid fashion onto the top surface of the horizontally disposed carrier track, 16.

The side access door, 6, is preferably on the same side of the container which includes the crank handle, 20, for contracting the carrier support mounting mechanism. At the outer end of a first support tube, 28, there is provided a vertically extending leg, 22, which includes a pivotable foot, 26, and a car top engaging hook, 24. Upon a rotation of the crank handle, 20, a crank shaft within the support tube, 28, will contract the inner end of the support tube, 28, towards the opposed inner end of a second support tube, not shown. As the support tubes are contracted, there will be an application of contractive forces upon the roof of the vehicle, and the forces will be exerted in the vicinity of the side edges of the roof. The advantages and a further understanding of this car top mounting arrangement may be had by reference to the above-noted parent application, Ser. No. 794,900, which is incorporated herein by reference for this purpose.

Figure 6:
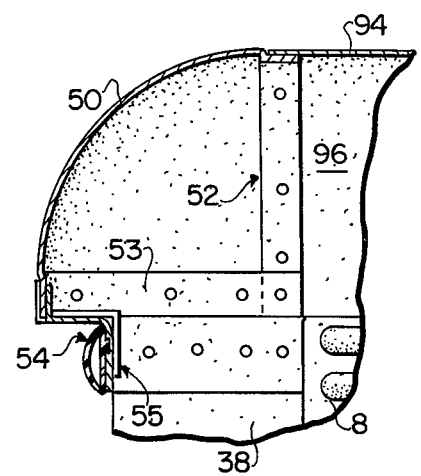
FIG. 6 is a sectional view taken along line 6—6 of FIG. 5.
Figure 5:
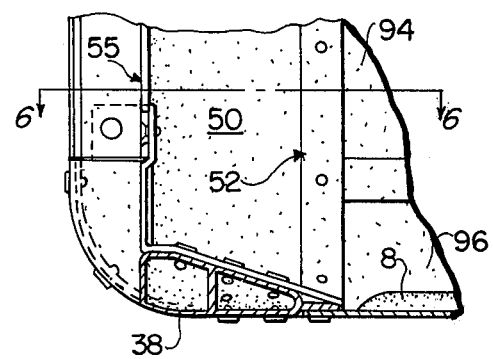
FIG. 5 is a sectional detail view of a lower corner of the container showing the door frame construction.

To further appreciate the structural integrity achieved by the present invention, it should be appreciated that the the illustrated representative forward front corner support, 50, includes flanges totally around its perimeter, with one portion of the perimetrical flange being shown at 52 in FIGS. 3 and 4. Flange 52 extends completely around the perimeter of the forward front corner support member, 50, and is curved for mating engagement with the upper horizontal edge support, 88, as well as the lower horizontal edge support, 96. When the frame is so defined by the interconnections of the corners with the deck and the upper horizontal support members, there will be further exposed portions of the perimetrical flange, 52, and upon these exposed portions the planar members can simply be attached to define the respective sides of the rectangular configuration. As shown in FIGS. 4–6, the top of the container is a planar sheet of material, 78, and it is riveted or otherwise connected to the portion of the perimetrical flange 52 which is exposed after the corner member has been interconnected adjacent to the upper horizontal edge supports. In a similar fashion, the forward side planar member, 94, is riveted or otherwise connected to the remaining exposed portion of the perimetrical flange, 52. The forward side planar member, 94, is also then riveted or otherwise connected to the perimetrical flanges which remain exposed, for example, on the lower horizontal surface of the upper horizontal edge support, 88, and the upper horizontal surface of the lower horizontal edge support, 96.

FIG. 4 illustrates an access door hinged to a first perimetrical flange portion on the lower horizontal edge, 48, of the associated upper horizontal edge support, 42. This first perimetrical flange portion, 48, may also be recessed from that vertical side dimension of the container, so that the outer surface of the door, 6, itself defines a planar surface for that side of the container. The door also includes a curved portion proximate its horizontal edge that is opposite to the hinged edge, 46, and on this curved portion there is illustrated a latching member, 58, which is operable for engagement with the latch mechanism, 56, which is supported on the lower horizontal door frame support, 38. This lower horizontal door frame support is itself flangedly interconnected to the horizontal deck, and it is preferred to have a bottom door seal, 40, provided for effective sealing of the lower portion of the door. Additionally, the flange portion, 48, may also include an upper door seal, 44, as shown in FIG. 4. As shown in FIG. 6 the vertical sides of the door frame, 55, may also include an elastomeric sealing element, such as 54. It should be noted that the door frame, 55, is itself flangedly mounted upon the perimetrical flange portion, 53, of the exemplary vertical corner support, 50. When the access door, 6, is downwardly lowered to the closed position as shown, the latching mechanism may be a draw pull lock type, as shown in 56, which includes a ring member, 60, for secure engagement over the draw pull latch, 58. As should be further evident from FIG. 4, the door frame mounting ensures that the overall configuration of the container is maintained smooth; uninterrupted by the structural arrangement of the door and the associated frame structure.

FIGS. 7 and 8 illustrate further constructional features of the car top carrier construction taught by the present invention. The access door, 6, is maintained in the upright position by the provision of a door brace, 66, which is a resilient element that engages an aperture, 72, within the brace plate, 62. The brace plate, 62, is connected to the door frame portions 98 and 55, as by rivets, 74, illustrated in FIGS. 7 and 8. The door brace, 66, is preferably of a spring-like metal construction, and bolted at its proximate end, 68, as by fasteners, 70. The distal end of the brace, 100, is configured as shown in FIG. 7 so that it will fit into the lower portion of aperture 72, when the door is in the position of FIG. 7. Because the hinging, as well as the latch and bracing mechanism for the door, 6, are mounted directly upon flanges of the associated upper horizontal edge support and the adjacent vertical corner supports, there is no load-bearing requirement imposed upon the thin planar material of the container, such as the side, 94, or the top, 78.

Figure 11:
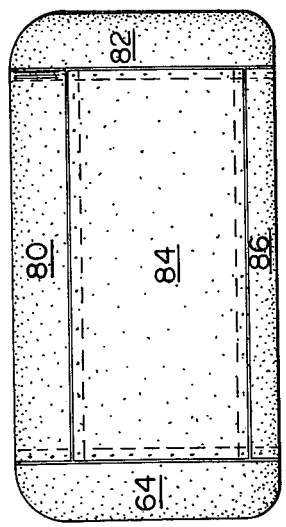
FIG. 11 is an external view of the right side of the view of FIG. 10.
Figure 9:
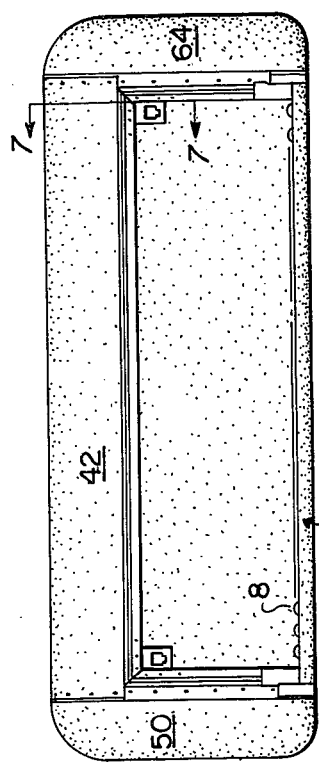
FIG. 9 is a front view of the present invention without the access door in position, further showing the partial sections of FIG. 7 on line 7—7.
Figure 10:
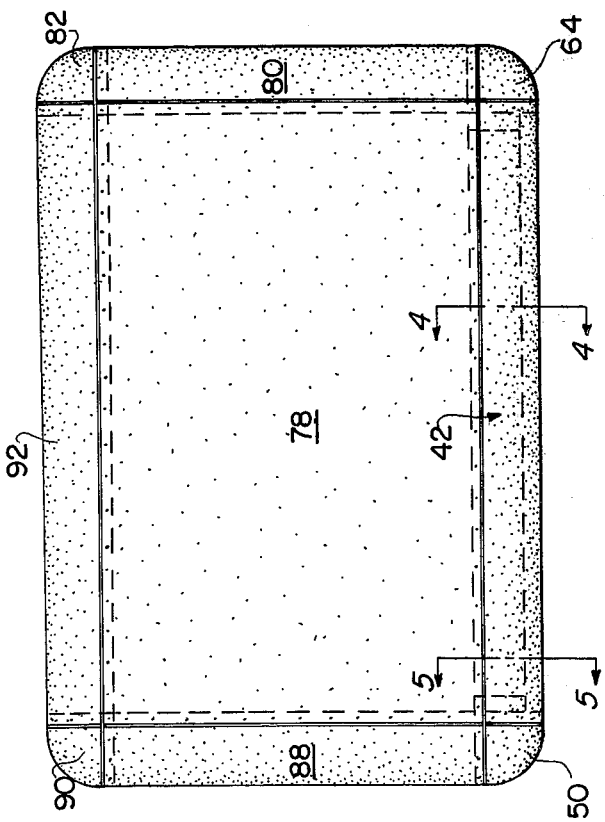
FIG. 10 is a top view of the present invention, further showing the views taken respectively in FIGS. 4 and 5 along lines 4—4 and 5—5.

FIGS. 9, 10 and 11 illustrate further views of the structural arrangement for the carrier taught herein, with the door removed in FIG. 9 for clarity. It can readily be appreciated that the present invention maintains a rectangular solid configuration, with all edges and corners being generously radiused at all intersections of planar surfaces which define the overall container configuration. A further advantage of the present invention is the maximization of interior room within the container, since the load-bearing frame members are all extrusions which require no internal bracing or internal frame structure to supply the necessary strength and rigidity required of the container. In this fashion there are no protruding elements within the cargo area so that the user will have maximum access to the volume defined by the interior of the container. The preferred material for the container structure taught herein is aluminum, so that the extruded members, the sheet material, and the rectangular carrier track may be of sufficient strength, without undue weight penalty. Since the present invention significantly takes advantage of perimetrical flanges on the members defining the frame structure, the preferred embodiment may simply be constructed by using rivets to interconnect the mating flange portions of the perimetrical flanges on each of the frame members, as well as the means for interconnecting the planar side and top members to the thusly defined frame structure.

While we have completely described the preferred embodiment of our invention, it is to be understood that the scope of the present invention is to be defined by the scope of the appended claims.

We claim:

1. A car top carrier assembly of a carrier container having a bottom surface operatively interconnected to the top surface of a horizontally disposed means for mounting said carrier container, and comprising
   (A) a container characterized by an overall rectangular solid configuration, wherein the edges and corners are radiused between all intersections of planar surfaces otherwise defining said container configuration; wherein,
   (B) said container has a frame comprised of a horizontal deck member, which defines the bottom surface of said container, vertical corner supports, which define the four vertical corners of said container, and horizontal edge supports, which define the four horizontal upper edges of said container; wherein, further,
   (C) each of said corner supports and each of said edge supports includes a perimetrical flange, wherein opposite ends of the upper horizontal edge supports, and upper portions of said vertical corner supports, include mating flange portions that are flangedly interconnected to define load-bearing portions of said container, and wherein, further,
   (D) planar members extend between exposed portions of the perimetrical flanges on said thusly interconnected frame to thereby define the top and at least one side of said container, and
   (E) at least one vertical side of said container includes an access door which is structurally supported by, and operably mounted upon, the horizontal edge support and vertical corner supports which define said at least one vertical side.

2. A car top carrier assembly according to claim 1 wherein said horizontal deck comprises a rectangular member which is flangedly interconnected, through lower horizontal edge support members, to portions of the perimetrical flanges which are proximate the bottom of each of said vertical corner supports.

3. A car top carrier assembly according to claim 1 wherein each of said vertical corner supports and horizontal edge supports are comprised of unitary metallic extrusions, and each of said planar members is comprised of a rectangular sheet material.

4. A car top carrier assembly according to claim 1 wherein one vertical side includes an access door, and said access door is hinged to a first perimetrical flange portion on the lower horizontal edge of the associated upper horizontal edge support which defines said one side, wherein a door frame is supported upon vertical portions of the perimetrical flanges on each associated vertical corner support, and upon the upper horizontal edge support and a horizontal edge extending from said deck member.

5. A car top carrier assembly according to claim 4 wherein said access door frame is recessed so that an outer surface of said door defines a planar surface for said one side of said container, said door also including a curved portion proximate its horizontal edge that is opposite its hinged edge, said curved portion also supporting a latching member which is operable for engagement with a latch mechanism supported on a lower horizontal door frame support, which is flangedly interconnected to said horizontal deck.

6. A car top carrier assembly according to claim 1 wherein the carrier mounting means further comprises:
   (A) at least one horizontally disposed carrier track with its top surface attached to the bottom surface of said container wherein a pair of support members are slideably positioned within said track, each support member having an outer end and an inner end;
   (B) vertical support legs extending downwardly from each of said respective support members, and including car top engaging means, at the bottom of said each support legs, which are operable for engaging a car top proximate ledges at opposite sides of said car top; and
   (C) means to contract and extend the opposed inner ends of said support members, whereby a contractive engagement force may be exerted by said car top engaging means against a car top.

7. A car top carrier assembly according to claim 6 wherein a pair of horizontally disposed carrier tracks are provided, and said means to contract each pair of said support members comprises a crankshaft and a crank handle proximate the outer end of one of said support members.

8. A car top carrier assembly according to claim 7 wherein an access door is provided on one vertical side of said container, and each of said crank handles is located below said same vertical side.

9. A car top carrier assembly according to claim 6 wherein each of said vertical corner supports and horizontal edge supports are comprised of unitary metallic extensions, each of said planar members is comprised of a sheet material and each of said carrier tracks is comprised of a unitary rectangular tubing.

10. A car top carrier assembly according to claim 9 wherein said extrusions, said sheet material, and said rectangular tubing are of aluminum.

11. A car top carrier assembly according to claim 1 wherein rivets are used to interconnect both the mating flanges of said frame and the planar members to said frame.

* * * * *